United States Patent [19]
Polonsky

[11] Patent Number: 5,348,227
[45] Date of Patent: Sep. 20, 1994

[54] IRRIGATION SYSTEM HAVING GROUND MOISTURE RESPONSIVE CONTROL JAR VALVE REGULATION

[76] Inventor: Eli Polonsky, 1608 S. Kenton St., Aurora, Colo. 80012

[21] Appl. No.: 48,504

[22] Filed: Apr. 20, 1993

[51] Int. Cl.$^5$ .............................. B05B 12/08
[52] U.S. Cl. ........................... 239/63; 137/78.3
[58] Field of Search .......................... 239/63–65, 239/145; 137/78.3

[56] References Cited

U.S. PATENT DOCUMENTS

| | | | |
|---|---|---|---|
| 3,910,300 | 10/1975 | Tal | 239/63 |
| 4,055,200 | 10/1977 | Lohoff | 239/63 |
| 4,922,945 | 5/1990 | Browne | 239/63 |
| 4,938,248 | 7/1990 | Browne | 239/63 |
| 5,117,855 | 6/1992 | Goldsmith | 239/63 |
| 5,148,825 | 9/1992 | Gil et al. | 239/63 |

FOREIGN PATENT DOCUMENTS 686685 9/1979 U.S.S.R. ........................ 239/63

*Primary Examiner*—Karen B. Merritt
*Attorney, Agent, or Firm*—Aquilino & Welsh

[57] ABSTRACT

An irrigation control system for regulating the fluid flow to a plurality of spray heads, including a fluid flow controller for each individual spray head, including a pressure operated, biased valve closure member and a slow release control operable in response to ground moisture to operate the valve closure member.

12 Claims, 3 Drawing Sheets

IRRIGATION SYSTEM HAVING GROUND MOISTURE RESPONSIVE CONTROL JAR VALVE REGULATION

BACKGROUND AND SUMMARY OF THE INVENTION

The present invention relates to an improved irrigation or sprinkler system, and more particularly to an irrigation system which operates at maximum efficiency to provide adequate moisture in accordance with the amount of moisture in the soil in a particular area.

When irrigating a large area such as a crop field or lawn, differences in the soil content, drainage, topography and ground moisture at a given time are all factors which determine the amount of water needed to properly irrigate the particular area to a maximum level without over or under irrigating, causing subsequent damage to the plant life. It is well known to provide irrigating systems which are operated by timers and moisture sensors to determine the amount of moisture applied to a particular area. These systems are normally adequate when ambient conditions are within normal ranges, however, more adverse conditions often result in a non-uniform or less than adequate application or overapplication of water. For example, if water pressure in a system is low, sprinkler heads in some of these known systems will not operate to maximum potential and the areas designed to be covered by the particular sprinkler heads will not receive the proper amount of water. Because moisture sensors are generally located adjacent sprinkler heads, it is not unusual for a sensor to receive what appears to be an adequate amount of moisture, whereas the area designed to De covered by the sprinkler heads does not. This results in the water being turned off without adequate coverage to the particular area.

In systems where there are a large number of sprinkler heads on a single line, the ones that are located furthest from the source of water normally receive lesser amounts of water than those closer to the supply, particularly when the pressure is low. This causes the closer sprinkler heads to operate normally, and result in an inadequate amount of water being discharged from the further sprinkler heads, resulting in uneven irrigation.

The present invention represents an improvement over the prior systems by providing a unique moisture sensor which controls pressure at the sprinkler head, which in turn controls the operation of the head to regular the amount of water being discharged. The system includes a unique relative moisture sensor, including a metering chamber having a wicked outlet positioned in the ground. The discharged through the wicked outlet is controlled by the amount of moisture in the ground such that water discharges from the metering chamber at a greater rate when there is little or no moisture in the soil. The discharge is retarded when there is moisture in the soil due to the saturation of the wick, which inhibits the discharge flow. The metering valve is directly connected to a pressure chamber which controls the flow through the spray heads, including a unique pressure sensing arrangement whereby the presence of water in the chamber keeps the valve to the spray heads closed, and release of the water in the pressure chamber allows the spray head valve to open. Therefore, when the ground is moist, water remains in the metering chamber and in turn, remains in the pressure chamber within the valve. When the moisture in the ground dissipates, water discharges from the metering chamber, and in turn discharges from the pressure chamber, allowing the valve to open to permit additional flow.

Among the objects of the present invention are the provision of a sprinkler head system which will operate at its maximum design potential during both normal and low water pressure situations to provide adequate irrigation of a variety of areas covered by the system.

Still another object is the provision of a sprinkler system which is directly controlled by the amount of moisture in the ground.

Still another object is the provision of a sprinkler head system in which individual sprinkler heads may be controlled independently of the others to ensure proper irrigation level.

A further object of the present invention is the provision of a sprinkler head system which operates to prevent both underwatering and overwatering of an area being irrigated. These and other objects will become apparent with reference to the accompanying drawings and specification.

DESCRIPTION OF THE PREFERRED EMBODIMENTS

Figure 1:
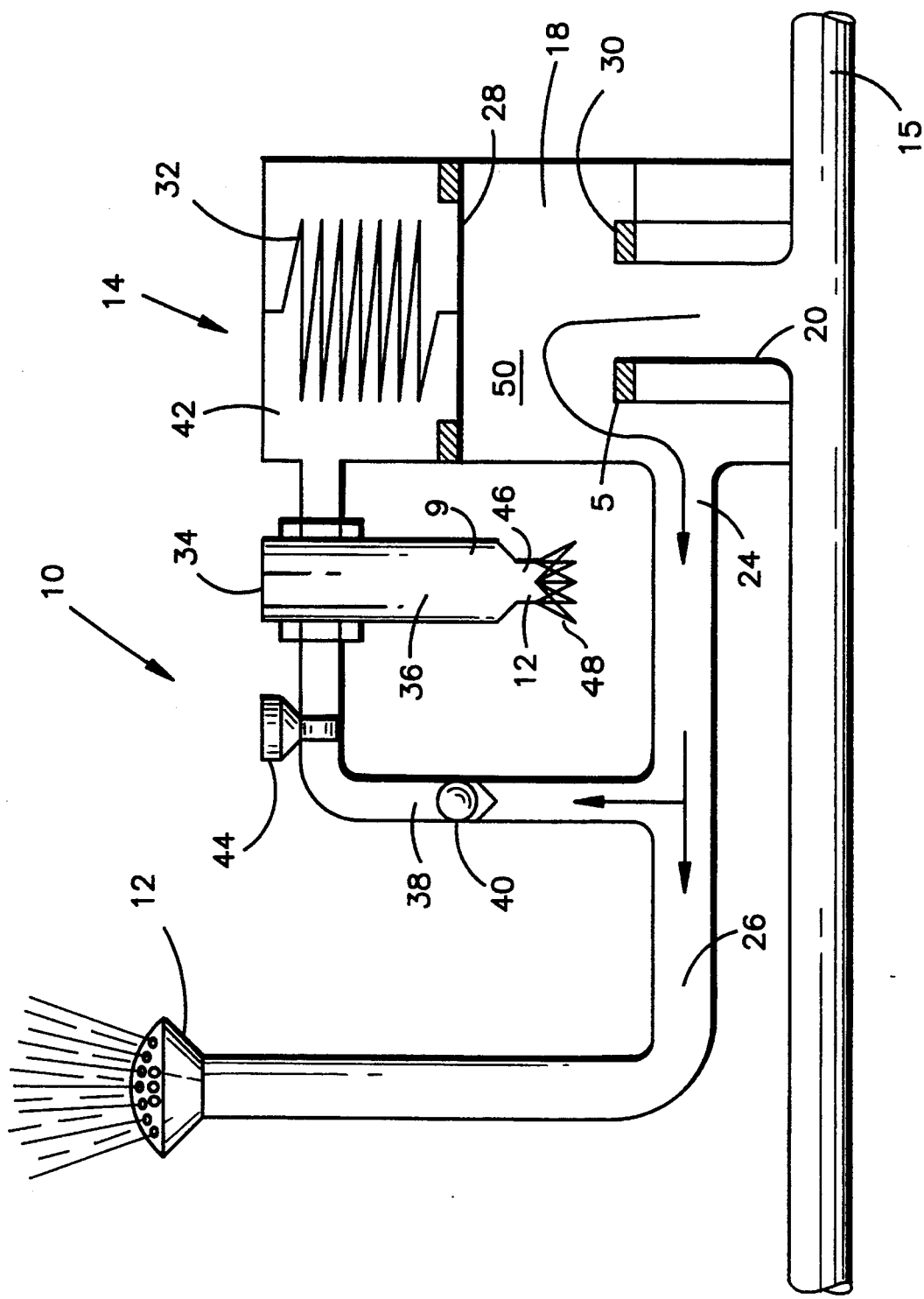
FIG. 1 is a schematic view, partly in section, of the irrigation system of the present invention.

Referring to the drawings, FIG. 1 shows an irrigation control system 10 of the present invention which permits controlled irrigation of an area in accordance with the relative moisture of the soil in the area. The system is designed to operate with a plurality of irrigation spray heads 12, only one being shown. Preferably, the irrigation spray heads 12 are spaced about the periphery of an area to be irrigated and use water from a main water supply line 15. The irrigation control system 10 of the present invention uses a series of controller units 14, each including a valve 18 having an input opening 20 connected to the water supply line 15. It will be appreciated that each spray head 12 is controlled by a separate valve 18, connected to the supply 15. The valve 18 includes an outlet 24 connected to the spray head 12 through spray head conduits 26. The valve 18 includes a diaphragm closure 28 structured to cooperate with a valve seat 30 for controlling flow therethrough. The diaphragm 28 is resiliently biased using a pressure sensitive spring 32 to keep the diaphragm 28 on the valve seat 30 in a normally closed condition, separating an upper chamber 42 and a lower chamber 50 of the valve 18 until the bias of the spring is overcome by pressure, as described hereinbelow. The opening and closing of the valve 18 is controlled by a relative moisture sensor 34 including a metering chamber 36, and a bypass conduit 38 connected between the spray head conduit 26 and the upper chamber 42 of the valve 18. The size of the chamber 42 is regulated by the position of the diaphragm 28 and is structured to receive pressurized fluid from the spray head conduit 26 through bypass conduit 38 and ball valve 40. The amount of fluid passing through the bypass conduit 38 is regulated by a metering valve 44 which controls the fluid flow through the conduit 38.

It will be appreciated that the water supply line 15, the valve 18 and the moisture sensor 34 are placed below the surface of the soil and that only the discharge portion of the spray head 12 needs to be above the ground surface. The metering chamber 36 has a slow release discharge 46 filled with a wick 48 or similar fluid flow control device which permits fluid within the chamber 36 to be controllably released in the soil. Although a wick is described, it will be appreciated that any other suitable flow control means could be adapted for this purpose.

The relative moisture sensor 34 determines the moisture content of the subsoil adjacent the area of the spray head 12 in order to control the opening of the diaphragm 28 of the valve 18, which in turn regulates the flow of water to the spray head.

Initially, when the area is to be irrigated, water from the supply line 15, is transferred under pressure into the lower chamber 50 of the valve 18. Assuming the pressure in the supply line 15 is sufficient to overcome the bias of the spring 32, the diaphragm 28 is lifted from the valve seat 30, thereby permitting water to flow out of the discharge opening 24 into the spray head conduit 26. The water also flows in the conduit 38 into the metering chamber 36 at a rate controlled by the metering valve 44. Once the chamber 36 is filled, water flows out of the chamber 36 into the upper chamber 42 of the valve 18. When a sufficient volume of water enters the upper chamber 42, the pressure of the water forces the diaphragm 28 downwardly until it engages the valve seat 30, closing the valve and thereby cutting off flow to the spray head conduit 26.

The slow release discharge 46 of the metering chamber 36 regulates the flow of water out of the metering chamber into the soil. It will be appreciated that when the ground is saturated from the irrigation water discharged from the spray head 12, the flow out of the metering chamber 36, which wicks into the soil, is substantially retarded, and therefore the metering chamber 36 is quickly filled, which in turn fills the upper chamber 42 and maintains the pressure in the upper chamber 42, keeping the diaphragm 28 in a closed position. As the moisture in the ground begins to dissipate, the fluid in the metering chamber 36 is able to pass out of the discharge 46 at a more rapid rate. When a sufficient volume of water is discharged from the metering chamber 36 into the soil, the pressure of the fluid in the upper chamber 42 is reduced, permitting the diaphragm 28 to be lifted off of the valve seat 30, assuming there is sufficient pressure in the water supply line 15 to overcome the bias of the spring 32.

Thus, it will be appreciated that when the soil is moist and saturated with fluid, the water supply to the spray head is cut off, since the diaphragm 28 is actuated to its closed position. Once the soil begins to lose its moisture, the pressure in the moisture sensor flow path is reduced and the valve opens as described hereinabove.

Each spray head or series of spray heads are provided with an irrigation controller unit 14 to regulate the moisture through the head. The system permits the controller units 14 to operate independently, each from the other, and one or a series of spray heads may be in operation, whereas others are not, depending upon the relative moisture of the soil as determined by the relative moisture sensor 34 adjacent the particular spray head. The operation of the system is also dependent upon the water supply line pressure, so that there must be enough pressure in the supply line to overcome the pressure of the bias of the spring in each controller unit 14. Here again, it is possible for one or more of the controller units 14 to function while others do not, due to the differences in pressure.

With the present invention, it would be possible to operate all the controller units 14 at the same time if the supply pressure is sufficiently great. On the other hand, various controller units 14 can be separately and/or sequentially operated so that each spray head 12 within the system in turn is operated to provide the necessary required moisture.

Figure 2:
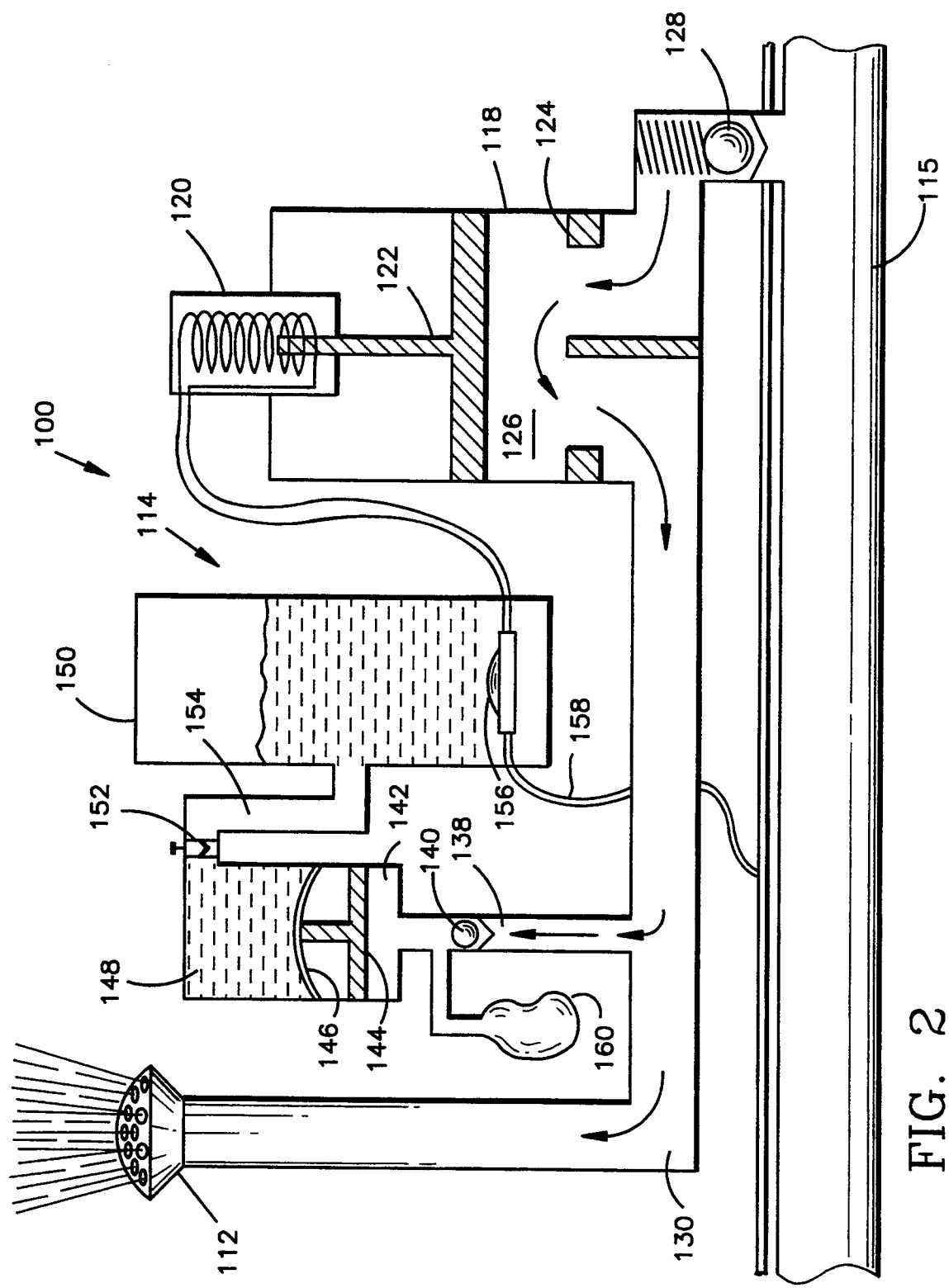
FIG. 2 is a schematic view, partly in section, of a second embodiment of the irrigation system of the present invention.
Figure 3:
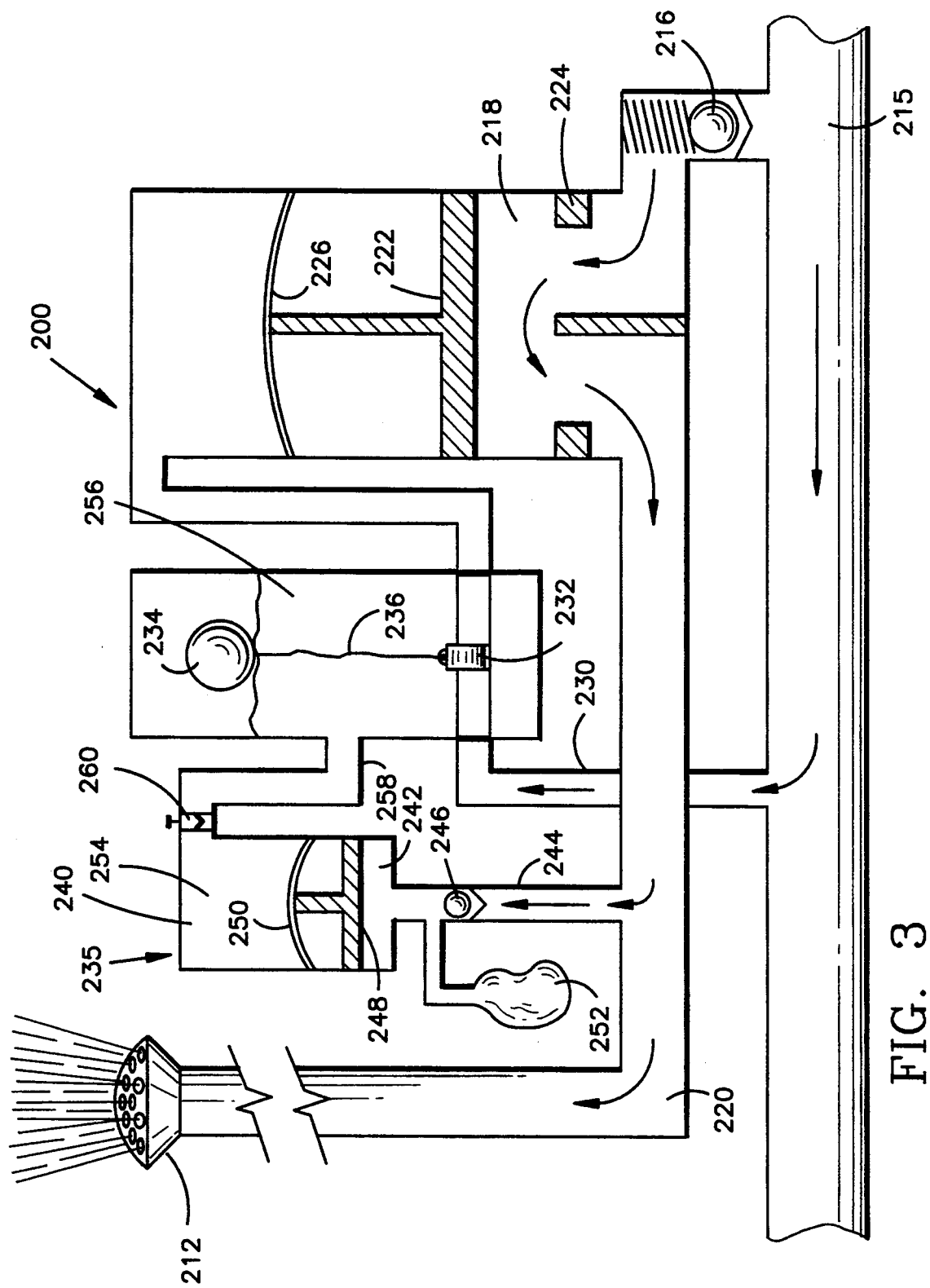
FIG. 3 is a schematic view, partly in section, of the third embodiment of the irrigation system of the present invention.

A second embodiment of an irrigation system 100 of the present invention having controlled irrigation is shown in FIG. 2. In this embodiment, a pressure sensor system is used with oil as a working fluid to operate a solenoid valve, which in turn, controls the water delivered to the irrigation heads. Referring to the drawings, the system is designed to operate with a plurality of irrigation spray heads 112, in the same manner as the system illustrated and described with respect to FIG. 1, hereinabove. The control unit 114 includes a solenoid-operated valve 118, having a solenoid 120 and a reciprocal valve 122, which cooperates with a valve seat 124 to open and close a fluid flow path through a lower chamber 126 in valve 118. When held in an open position, valve 122 is raised above the seat 124 by the solenoid 120, permitting water to flow from the supply 115 through a one-way check valve 128, through lower valve chamber 126 into spray head conduit 130, which is connected directly to the sprinkler head 112. When the solenoid is deactivated, the valve closure 122 is dropped by the solenoid to engage the seat 124, thereby cutting off flow to the sprinkler heads from the main water supply line 115.

The opening and the closing of the solenoid valve 118 is controlled by a pressure sensor in the controller unit 114. The controller unit converts water pressure to oil pressure, which in turn operates the solenoid valve 118. A bypass conduit 138 allows water to flow from the spray head conduit 130 through a one-way check valve 140 into a pressure chamber 142. The chamber includes a reciprocal piston 144, the upper end of which is attached to a diaphragm 146, which separates the pressure chamber 142 from an oil chamber 148. The oil in the chamber 148 is in communication with a pressure reservoir 150 through a metering valve 152 and flow conduit 154. The pressure reservoir 150 includes a pressure sensor switch 156, which is operably connected to the electrical circuits, as represented by wires 158, which energize the solenoid coil 120. When sufficient amounts of oil are in the pressure reservoir 150, the pressure sensor switch 156 is actuated, opening the circuit 158 to the solenoid coil, thereby deenergizing it and allowing the valve 122 to be released and close. Conduit 138 is also connected to a wicking device 160, which controls the amount of fluid in chamber 142 in the same manner as described with respect to the system of FIG. 1.

Therefore, when the ground is moist, water flow through the wick 160 is retarded, which in turn increases the pressure in chamber 142, which in turn increases the pressure on the sensor 156 in the pressure reservoir 150 to control the operation of the solenoid 120.

A third embodiment of an irrigation system 200 in accordance with the present invention is similar to the previous systems described herein above, and uses a float-diaphragm to control the operation of a series of spray heads 212, only one of which is shown. The heads 212 use water from a pressurized water supply line 215, which is supplied through a check valve 216, a control valve 218 and a spray head conduit 220. The valve 218 includes a closure 222 structured to fit tightly against a seat 224 when in the closed position to shut off flow from the main supply line 215 to the spray head conduit 220. The closure 222 is connected to a diaphragm 226, which regulates the opening and closure of the valve 218. The diaphragm 226 is spring biased, so the valve 218 is normally closed until the pressure of the water from the main line overcomes the spring bias of the diaphragm 226.

The valve 218 is closed by back pressure against the diaphragm 226 by water which is fed through a bypass line 230 in fluid communication with the main water supply line 215. The bypass line 230 is normally blocked to fluid flow with a plug valve 232, which is operably connected to a float 234 by a flexible connector 236.

A relative moisture sensor 235 controls the position of the float 234. The sensor 235 includes a metering chamber 240. A bottom chamber 242 is in fluid communication with irrigation water in the spray head conduit 220 through a metering conduit 244 and one-way check valve 246. A plunger 248 is connected to a spring biased diaphragm 250. The plunger 248 moves upwardly and downwardly in accordance with the pressure of the fluid in the lower chamber 242. A wicked outlet 252 connected to lower chamber 242 is located in the soil adjacent the sprinkler head 212. The amount of water in the lower chamber 242, and consequently the pressure therein, is regulated by the amount of water which bleeds off the wicked outlet. When the ground is saturated, little water is released through the wicked outlet 252, and pressure builds in the lower chamber 242. When the ground is dry, more water is discharged through the wicked outlet, and the pressure in the lower chamber 242 is low. The upper chamber 254 of the metering chamber 240 is filled with oil or other hydraulic fluid and is in fluid communication with oil in a float chamber 256 through conduit 258 and metering valve 260. The float 234 floats on top of the oil in the float chamber 256, and rises and lowers in accordance with the amount of oil in the chamber, which in turn determines the position of the plug valve 232.

Thus, it can be seen that when the ground is saturated, little water is discharged from the wicked outlet 252 and the pressure in the lower chamber 242 causes the plunger 248 to move upwardly against the diaphragm 250, which pressurizes the oil in the upper chamber 254, causing it to spill over into the float chamber 256 through conduit 258 and metering valve 260. When the oil level in the float chamber 256 rises, the float 234 pulls the plug 232, allowing water to back fill the control valve 218 through bypass line 230 until the pressure on the closure 222 and diaphragm 226 is overcome to shut the valve 218, thus cutting off flow to the spray head 212. As the ground dries, more water is released from the wicked outlet 252, thus reducing the pressure in the metering chamber 240, allowing the oil level in the float chamber 256 to lower, thereby plugging the conduit 230, which in turn reduces the pressure in the valve 218 to open it to fluid flow.

It will be appreciated that in each of the embodiments shown, the metering valves and the wicked outlet can be regulated to provide precise periods of time when the spray heads are on to control the amount of water in the soil.

It will also be appreciated that the above embodiments are examples and that other modifications may be made in the invention in keeping within the spirit and scope of the present invention.

I claim:

1. An irrigation control system for regulating fluid flow to a plurality of individual spray heads; wherein the improvement comprises:

a source of irrigation fluid;

a plurality of spray heads in fluid communication with said source of irrigation fluid;

an irrigation fluid flow controller for each individual spray head, said controller including an individual control valve for regulating the flow of irrigation fluid to the spray head and a ground moisture regulated control means for closing said individual control valve when sufficient ground moisture is present in the vicinity of the controller to shut off the flow of irrigation fluid to the spray head;

said individual control valve having a fluid inlet fluid communication with said source of irrigation fluid;

a fluid outlet in fluid communication with at least one of said spray heads;

a valve seat formed at a distal end of said fluid inlet;

a valve chamber;

a valve closure member in said chamber biased in a normally open position away from said valve seat whereby in said open position irrigation fluid is permitted to flow through the valve between said fluid inlet and said fluid outlet;

a fluid conduit between said fluid outlet and said ground moisture regulated control means;

said ground moisture regulated control means including a fluid chamber in fluid communication with said fluid conduit and said valve chamber, said fluid chamber having a slow release outlet for regulating the amount of fluid in said fluid chamber; the rate of release of said slow release outlet being controlled by the moisture content of the surrounding soil;

said fluid chamber, when filled with fluid from said fluid outlet through said fluid conduit by being in fluid communication with said valve chamber, creates a pressure, causing said valve closure member to engage the valve seat and close the valve, cutting off the flow of irrigation fluid to the spray heads.

2. The irrigation control system of claim 1 wherein said valve closure member is a spring biased pressure responsive diaphragm.

3. The irrigation control system of claim 1 further including a means for metering fluid flow into said fluid chamber.

4. The irrigation control system of claim 3 wherein said metering means is a metering valve.

5. The irrigation control system of claim 1 wherein said slow release outlet is an opening having a wick disposed therein in contact with the surrounding soil wherein the rate of fluid flow from said slow release outlet is controlled by the amount of moisture in the soil, which in turn controls the wicking rate of said fluid flow through the wick.

6. The irrigation control system of claim 1 wherein said valve closure member includes a solenoid coil to maintain the closure member in a normally open position.

7. The irrigation control system of claim 6 wherein said fluid chamber includes a fluid pressure chamber and a hydraulic fluid chamber, and further including a pressure operated switch in said hydraulic fluid chamber to control the operation of the solenoid coil in response to pressure within said fluid pressure chamber and said hydraulic fluid chamber to maintain the closure member in a normally open position.

8. The irrigation control system of claim 7 wherein said hydraulic fluid chamber includes a hydraulic pressure chamber and a pressure reservoir, and wherein hydraulic fluid is movable between said hydraulic pressure chamber and said pressure reservoir in response to pressure within said fluid chamber and said hydraulic fluid chamber.

9. The irrigation control system of claim 8 wherein fluid flow of hydraulic fluid between said hydraulic pressure chamber and said pressure reservoir is regulated by a metering device.

10. The irrigation control system of claim 1 further including means responsive to fluid pressure in said fluid conduit between said fluid outlet and said ground moisture regulated control means for permitting fluid flow therethrough.

11. The irrigation control system of claim 10 wherein said fluid pressure responsive means is a ball valve.

12. The irrigation control system of claim 1 wherein said fluid chamber includes a fluid pressure chamber and a hydraulic fluid chamber and further including a float chamber in fluid communication with said hydraulic fluid chamber, said float chamber including a float and plug valve attached thereto, whereby hydraulic fluid in said float chamber regulates the position of said plug valve attached to said float; a bypass line connected between said source of irrigation fluid and said valve chamber and a closure in said bypass line cooperating with said plug valve to regulate irrigation fluid flow therethrough in response to the hydraulic fluid level within said float chamber.

* * * * *